United States Patent
Mäenpää

(10) Patent No.: US 6,910,376 B2
(45) Date of Patent: Jun. 28, 2005

(54) MEASUREMENT METHOD AND SYSTEM IN THE MANUFACTURE OF PAPER OR PAPERBOARD

(75) Inventor: Tapio Mäenpää, Helsinki (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 10/468,603

(22) PCT Filed: Feb. 22, 2002

(86) PCT No.: PCT/IB02/00526

§ 371 (c)(1),
(2), (4) Date: Aug. 19, 2003

(87) PCT Pub. No.: WO02/066239

PCT Pub. Date: Aug. 29, 2002

(65) Prior Publication Data

US 2004/0079147 A1 Apr. 29, 2004

(30) Foreign Application Priority Data

Feb. 22, 2001 (FI) .............................................. 20010342
Feb. 26, 2001 (FI) .............................................. 20010374

(51) Int. Cl.[7] ................................................ G01L 5/04
(52) U.S. Cl. ...................................................... 73/159
(58) Field of Search ................... 73/159, 160, 862.453, 73/862.471, 862.391

(56) References Cited

U.S. PATENT DOCUMENTS

| 3,822,588 A | * | 7/1974 | Knight et al. .................... 73/81 |
| 4,901,585 A | | 2/1990 | Shepard et al. |
| 4,945,772 A | * | 8/1990 | Shepard et al. .......... 73/862.55 |
| 4,993,270 A | | 2/1991 | Petit et al. |
| 5,379,652 A | * | 1/1995 | Allonen .................... 73/862.55 |
| 5,383,371 A | * | 1/1995 | Laitinen ................... 73/862.55 |
| 5,446,334 A | | 8/1995 | Gaffney |
| 5,562,027 A | * | 10/1996 | Moore .......................... 100/35 |
| 6,306,261 B1 | | 10/2001 | Meschenmoser et al. |
| 6,547,229 B1 | * | 4/2003 | Hanson et al. ........... 270/52.09 |
| 6,636,335 B1 | * | 10/2003 | Tang et al. .................. 358/496 |

FOREIGN PATENT DOCUMENTS

| DE | 19941336 | 10/2001 |
| WO | WO 96/08363 | 3/1996 |
| WO | WO 96/25288 | 8/1996 |
| WO | WO 97/16834 | 5/1997 |
| WO | WO 01/73197 | 10/2001 |

* cited by examiner

Primary Examiner—Max Noori
(74) Attorney, Agent, or Firm—Cohen, Pontani, Lieberman & Pavane

(57) ABSTRACT

In a measurement method in the manufacture of paper or paperboard, different forces prevailing in a nip between a roll and a counter roll of an apparatus conveying a paper or paperboard web are measured. In the method there are several measurement points implemented with one or more film sensors (3) placed in the roll (1) in the transverse direction of the paper or paperboard web. The measurement information obtained from the measurement points by means of the sensor or sensors (3) is utilized to determine the pressure distribution of the nip. The film sensor (3) is a piezo- and pyroluminescent sensor from which the measurement information can be received optically at least in the initial stage, or a sensor comprising an electromechanical film (EMFi). The sensors (3) placed in the calender roll (1) can be utilized to measure the pressure distribution of the calender nip (N).

17 Claims, 3 Drawing Sheets

MEASUREMENT METHOD AND SYSTEM IN THE MANUFACTURE OF PAPER OR PAPERBOARD

PRIORITY CLAIM

Figure 1:
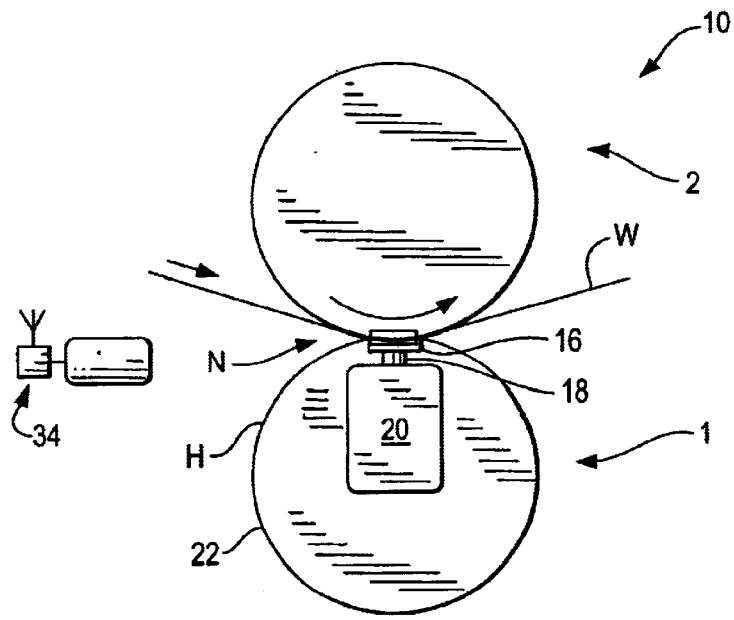

This is a U.S. national stage of application No. PCT/IB02/00526, filed on 22 Feb. 2002. Priority is claimed on an application filed in Finland—Application No.: 20010342, filed: 22 Feb. 2001 and an application filed in Finland—Application No.: 20010374, filed: 26 Feb. 2001.

The invention relates to a measurement method and system in the manufacture of paper or paperboard, in which forces prevailing in a nip between an element moving in the machine direction of an apparatus conveying a paper or paperboard web, and a counter element are measured.

The element moving in the machine direction may be the outer periphery of a rotating soft-faced roll, in which a coating constitutes the outermost layer and which forms a nip with a counter element, for example a rotating counter roll. The coating of such a roll can be made of polymer material, for example. The element moving in the machine direction may also be a belt, which is supported at the nip against the counter element by a shoe element or the like. The belt may be for example the belt shell of a roll, which is used as a shell of one of the rolls in a so-called shoe calender, inside which roll said shoe element is positioned. The counter element is typically a roll, which is arranged to rotate so that it moves in the machine direction (in the travel direction of the web) at the location of the nip. In all cases the paper or paperboard web to be processed travels via the nip, i.e. between the moving element and the counter element, said web being influenced for example by the pressure prevailing in the nip.

The invention relates especially to a system for measuring pressure distribution in such a nip which is formed between a counter element and a roll equipped with a coating, or between a counter element and a belt. Such a nip is typically present in a calender. In that case the invention relates especially to such a system by means of which it is possible to determine the linear pressure distribution of the calender nip in the cross-machine direction.

A separate pressure measuring device, which can be installed between rolls is disclosed for example in publications U.S. Pat. No. 4,901,585 and U.S. Pat. No. 4,993,270. The publication U.S. Pat. No. 4,901,585 describes a measurement system in which a measurement device composed of two elements with oblique opposite walls is placed between opposite rolls. Between the oblique surfaces of the elements a strip is installed, on which a strain gauge is attached. When the rolls are pressed against each other, the aforementioned elements slide against each other along the oblique surfaces as a result of the pressure that is generated, wherein the strain gauge placed between them measures the elongation of the strip on the basis of which elongation the pressure between the rolls is determined. The publication U.S. Pat. No. 4,993,270 describes a method and device for measuring the pressure between rolls in a rolling mill. The device described in the publication comprises a pressure sensor placed between the rolls, in which load cells of equal thickness are placed between the rolls, in parallel relationship to the roll axes, and the pressing force is determined as a combined outcome of the load cells. It is a problem in the pressure sensors of the above-described kind which are installed between rolls that it is not possible to utilize them for control and measurement of nip pressure during the manufacturing process, but in the manufacture of paper the paper machine must be stopped and the measurements have to be conducted during the stoppage of the paper machine. Furthermore, when the measurements are made when the machine is stopped, the conditions caused by the manufacturing process, such as variations in temperature and other factors cannot be taken into account sufficiently well.

The increase in the speeds of paper machines and the higher quality requirements have increased the need to obtain accurate measurement information for example on the nip pressures prevailing in calenders, as well as information on the effects of changing machine speeds and the conditions of roll coatings or belts on nip pressures. By means of real nip pressures the profiling of paper can be conducted more accurately than before, wherein the paper that is being produced has both better and more uniform quality. For example in calenders, the pressure distributions in the longitudinal and transverse directions of the web are important parameters in the control of the process. By measuring nip pressures it is possible to adjust the nip pressure or the pressure distribution of the nip to a desired level, thereby controlling for example the thickness of paper.

One purpose of the invention is to present a new method by means of which it is possible to transmit measurement information outside the measurement points during the operation of the apparatus conveying a paper or paperboard web and during the travel of the web via the nip between the moving element and the counter element for example in a paper or paperboard machine or finishing apparatus for paper or paperboard. The method introduces a new way of using sensors for example in the measurement of nip pressure distribution information. The method also introduces advantageous measurement sensors for determination of pressure distribution. It is characteristic to the method that there are several measurement points provided by one or more sensors placed in the moving element and the information obtained from the measurement points by means of the sensor or sensors is utilized to determine the pressure distribution of the nip. The pressure distribution of the nip can be determined in the machine direction (travel direction of the web) and/or in the cross direction (direction perpendicular to the travel direction of the web). The information is advantageously used for the control of the aforementioned pressure distributions in a control loop, in whose data processing and control unit a control variable is produced on the basis of the measurement information, said control variable controlling one or more actuators the operation of which can be utilized to affect the pressure distribution of the nip.

According to the invention, especially the pressure distribution of the nip between the moving element and the counter element in the apparatus conveying the paper or paperboard web in the cross direction (in the cross-machine direction, i.e. cross direction of the web) is measured in several measurement points at different locations in the transverse direction.

It is possible to place sensors in the moving element, for example inside the roll coating, underneath the same, or in a belt passed over the shoe element, with such a spacing that pressure information of the nip is attained from several measurement points in the machine direction and/or in the cross direction as the moving element is moving and the web is travelling via the nip.

The sensors are thus placed in the moving element to form a part of the same, and they move along with the roll or belt via the nip N.

Typically, the invention can be applied in a shoe calender or another corresponding treatment device of the web, in which the web to be treated is guided through a nip formed between a counter roll and a shoe element equipped with a belt shell (shoe roll). Typical arrangement according to the invention thus comprises one or more measurement sensors arranged in the belt forming said belt shell. The measurement sensor may be entirely or only partly placed inside the belt.

The sensors can be especially film sensors, which are capable of converting the pressure exerted on the film into a suitable output signal.

According to one alternative, the film sensor is composed of an elastic film and at least one sensor that is connected to the film and registers a deformation occurring in the film, such as compression or expansion. The film sensor can thus advantageously be composed of a thin foamed plastic film with permanent electric charge, such as EMFi film, and at least one electrode that is connected to said film and registers a deformation occurring in the film.

The above-mentioned EMFi film (Electro Mechanical Film) is composed of biaxially oriented plastic material. Biaxial orientation produces small lens-shaped gas bubbles or voids in the material, which provide the special properties for the material. The material is permanently electrified in connection with the manufacture in such a manner that a permanently charged plastic film is attained. Thus, it is possible to say that the EMFi film is composed of a bubble structure electret material, which constitutes a capacitor. On both sides of the EMFi film thin metal electrodes have been laminated, vapor-deposited or otherwise fastened, wherein the EMFi film becomes an electret film interacting with the environment. When an external force or pressure presses the film, the movement of the electrodes induces a mirror charge change for the electrodes, wherein the film functions as a sensor. This change in the charge can be measured by means of conventional electronics, wherein by means of the EMFi film it is possible to measure for example variations in pressure, vibration or acoustic waves, including ultrasound. Thus, if a mechanical or acoustic force is exerted on the EMFi film, it generates a voltage and functions as a sensor. The EMFi film can also function in the opposite manner, in other words, if an alternating voltage is coupled to the film, it changes the energy into vibration and sound, thus functioning as an actuator. From the EMFi film it is possible to produce for example sensitive sensors and coatings sensing force, pressure, touch or vibration. Because the material is thin and shapeable, the sensors can be integrated as a part of mechanical structures. Thus, the EMFi sensors can also be used as matrix sensors measuring the location of different forces or touches.

The EMFi films are especially well suited for use in such applications in which a thin, elastic, fault tolerant, durable and cheap sensor is required. The frequency range of the sensor is >100 kHz. The sensor is especially advantageous in applications in which large surface areas are monitored, which is the case in the nip. The sensor produced of the EMFi film can be manufactured in the exact shape and size. The disposal of the sensor after the use, i.e. when the moving element (belt or roll coating) is discharged, is not problematic, because the sensor does not contain toxic components even when it burns. As a result of its elastic structure, the EMFi film is quite sensitive to changes in the compressive pressure. The EMFi film measures the state of the nip directly, not indirectly like previously known piezoresistive sensors. The resistivity of the EMFi film does not change under the effect of an external force. The EMFi film gives a stronger electric signal than piezoelectric films, which signal has a completely linear output or response. The sensor made of EMFi film is cheap.

The measurement sensor can also be formed of a film whose charge distribution changes as a result of pressure exerted on the film and induces an electric charge, and of at least one electrode which is connected to said film and is capable of registering the change in the electric charge of the film.

In the belt or roll coating it is possible to arrange several films that form measurement sensors next to each other in the cross-machine direction, successively in a line in the travel direction of the belt or peripheral direction of the roll coating, diagonally in the travel direction of the belt or in the peripheral direction of the roll coating, or otherwise evenly or unevenly distributed over the surface area of the belt shell or roll coating.

In a second embodiment of the invention the measurement sensor can, on the other hand, be composed of an optical cable and at least one sensor connected to the optical cable and registering a change in the luminous intensity resulting from the deformation of the optical cable.

According to the second embodiment, the pressure information is measured by means of a PPL film, either by using camera technology or by transmitting the measurement information from the measurement sensors via optical fibres. The term piezo- and pyroluminescent (PPL) sensor refers to a thin film structure, which emits radiation under external mechanical or thermal stress, said radiation being proportional to the stress exerted on the point in question.

U.S. Pat. No. 5,446,334 describes the function of the sensor in more detail. In principle, the sensor is composed of two film structures put together, one of which is a so-called piezo-pyroelectric film (PPE) and the other a luminescent (emitting LED) film. The PPE film detects the thermomechanical stress changes exerted thereon as voltage differences between the different surfaces of the film, by means of which the LED film, in turn, is controlled in such a manner that local differences in stresses can be seen as different levels of luminous intensity. The combined film structure is called a piezo-pyroluminescent sensor, i.e. PPL sensor. Thus, the PPL sensor converts the thermomechanical stress distribution into a visible image, in which the (local) intensity of the luminescence indicates the local amplitude of the thermomechanical stress. The method requires that the films and the layers possibly covering the films are transparent, or the radiation emitted by the films can be registered and transferred forward for example by means of optical fibres.

In the measurement of the pressure distribution of the calender nip, for example for the purpose of controlling the calender, the pressure distribution information in the optical form that is emitted by the PPL sensors is registered by means of camera technique, or information is transmitted forward from the sensors placed in the polymer layer of the roll by means of optical fibres. It is, for example, possible to transmit the optical information via optical fibres to a transmitter part revolving with the roll, in which the information is converted into electric form and transmitted by radio technology to a stationary receiver part located outside the roll according to so-called telemetry principle. The receiver part is connected to a data processing and control unit to process the measurement information.

In this description and in the claims, unless otherwise indicated, the term belt refers to all such belt-like means, such as fabrics, wires, tapes, bands, belts or the like, which are used in connection with paper machines or the like to travel between a shoe element and a counter roll or a corresponding counter element, thus forming a nip via which the web travels.

The solution according to the invention provides a possibility to measure the nip pressure and nip pressure distribution in the actual process conditions during the run, thus providing a possibility of controlling the nip pressure during the run.

When compared to conventional measurement systems, the solution according to the invention also has the advantage that by means of the solution it is possible to measure the effect of changes in the machine speeds as well as the wearing of the belts and roll coatings on the nip pressures.

Figure 2:
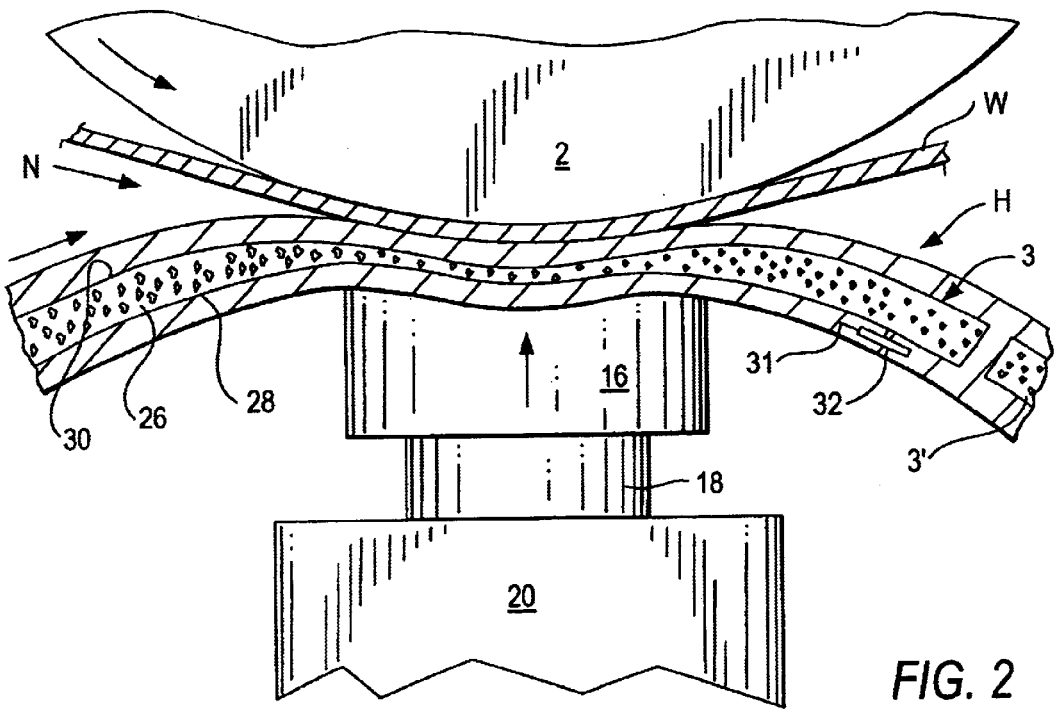

In the following, the invention will be described in more detail with reference to the appended drawings, in which FIG. 1 shows a schematical cross-section of a shoe calender taken along the travel direction of the web, in which shoe calender the system according to the invention is applied to determine the nip pressure, FIG. 2 shows an enlargement of the nip area of the shoe calender shown in FIG. 1

Figure 3:
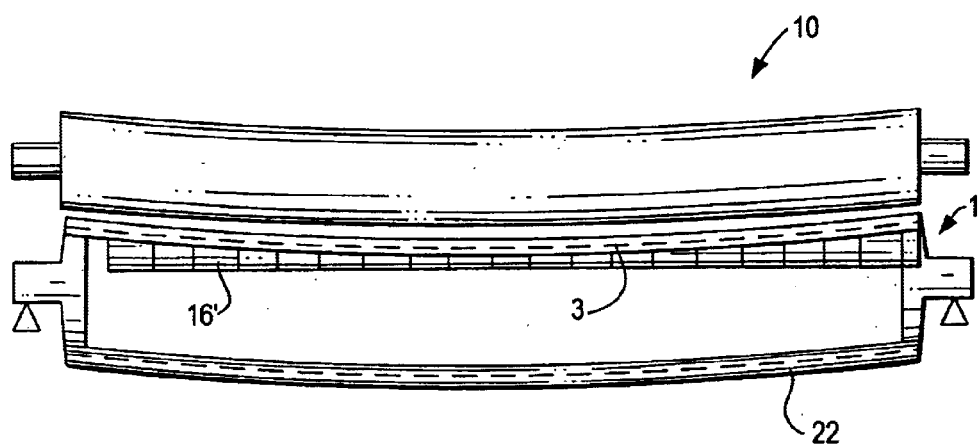
Figure 4:
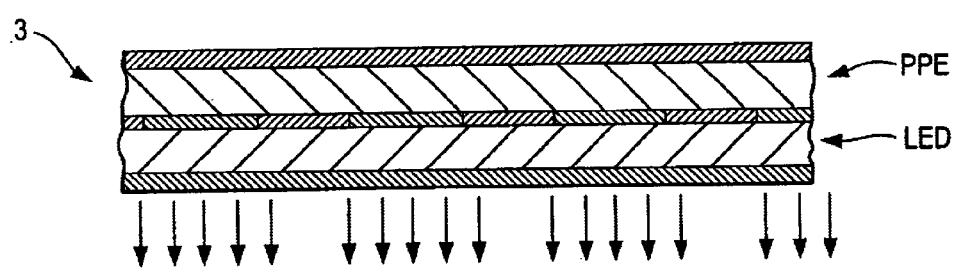
Figure 5:
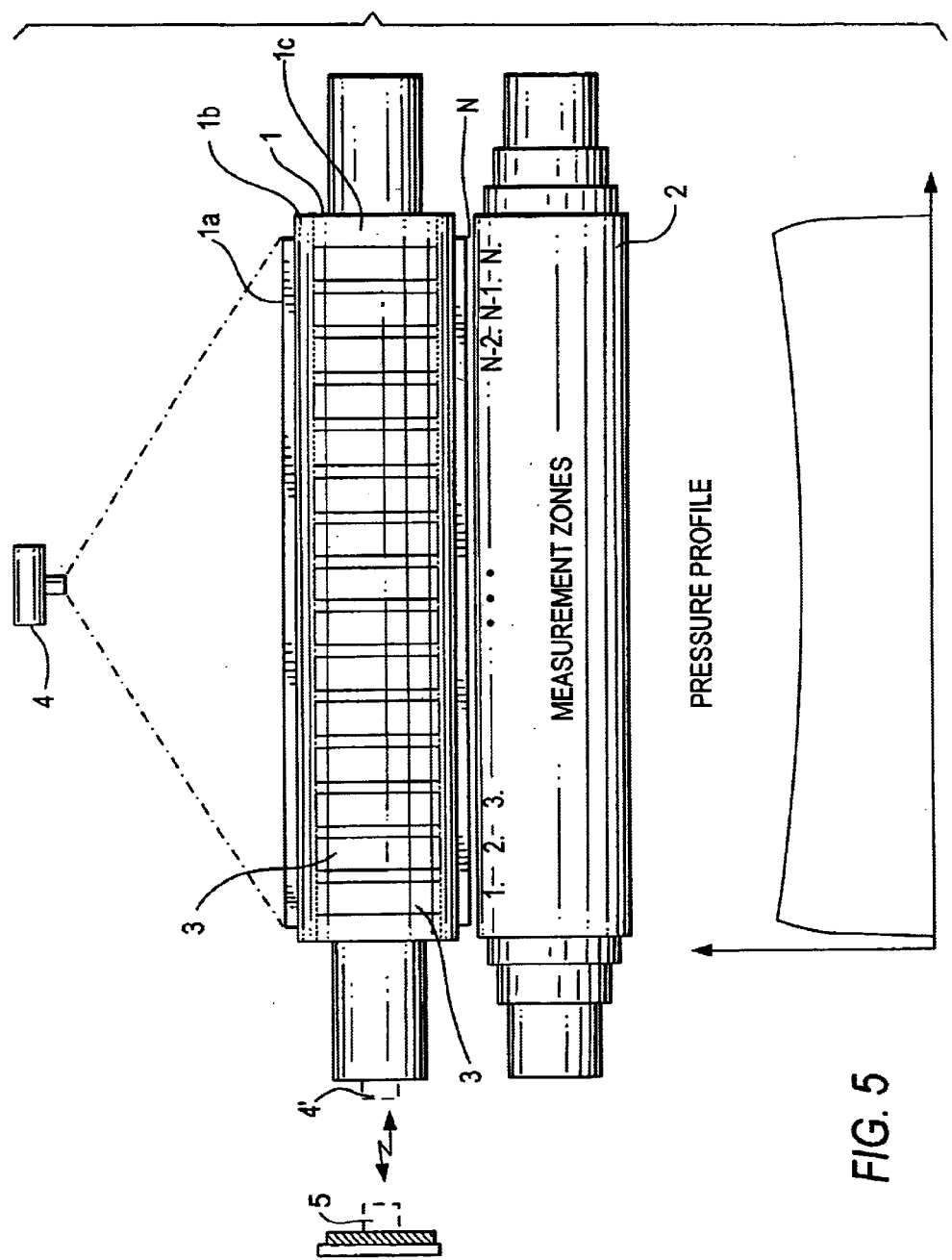

FIG. 3 shows a schematical cross-section of a shoe calender taken along the longitudinal direction of the rolls, in which shoe calender the system according to the invention is applied to measure pressure distribution in a calender nip, FIG. 4 illustrates the operating principle of a PPL sensor, and FIG. 5 illustrates the application of PPL sensors in connection with a calender.

FIGS. 1 and 2 schematically show a shoe calender 10 in which a calender nip N is formed between a shoe roll 1 and a counter roll 2. A paper web W or the like travels through the nip. The shoe roll 1 comprises a loading shoe, i.e. a shoe element 16 extending across the machine and moving in relation to the counter roll 2, said shoe element being attached by means of one or more arms 18 to a stationary beam 20 extending across the machine. Furthermore, the shoe roll 1 comprises a belt shell 22 revolving around the loading shoe 16 and the beam 20. The general structures of the shoe calender and the shoe roll equipped with a belt shell are known as such.

The belt shell 22 is an elastic, deformable shell that takes the shape determined by the loading shoe 16 and the counter roll 2. The required pressure in the nip N is attained by means of the moving loading shoe 16. The loading shoe 16 can, however, be kept substantially stationary during the run with respect to the machine direction to form a nip in the desired location.

According to the invention, a measurement sensor 3 shown in FIG. 2 is arranged inside the belt H forming the belt shell 22, to determine the pressure in the nip N. The measurement sensors can be optical cables or electromechanical film sensors, such as EMFi films or piezoelectric PVDF films i.e. polyvinylidene fluoride films, or other measurement sensors that function in the corresponding manner and can be fixed inside the belt. Advantageously, electromechanical film sensors, such as sensors containing an EMFi film are used. The PVDF films are piezoresistive film sensors, the function of which is based on registering the deflection of the film by means of a piezoresistor integrated in the sensor film. The value of the resistance is proportional to the deflection of the film, wherein the effective pressure can be calculated from the measurement of the resistance. Thus, these piezoresistive sensors are not used for direct measurement of the nip, i.e. a change in pressure, but an indirect i.e. calculated measurement result is obtained by means of the sensors. In optical cable sensors the drawback, in turn, is the small sampling frequency and poor tolerance against recurrent compression load. The electromechanical film sensor measures the state of the nip directly, not indirectly like piezoresistive film sensors, in other words an electric output variable proportional to the pressure is attained directly from the sensor.

In solutions according to the invention, the electromechanical film, optical cable or a corresponding element forming the measurement sensor can cover the periphery of the belt H entirely, in zones or spirally. Thus, there may be one or more measurement sensors in connection with the belt. The sensors can be located in the belt for example in lines or in some kind of a continuous pattern or they can be unevenly distributed over the surface area of the belt. The aim is typically to arrange the sensors in such a manner that the pressure exerted on the nip on each revolution of the belt can be stored.

Thus, it is possible to arrange several separate measurement sensors adjacently in the cross-machine direction, as shown in FIG. 3 and/or successively in the direction of the periphery of the belt, as indicated by measurement sensors 3 and 3' in FIG. 2.

In the solution shown by FIG. 2, which shows only a part of the measurement sensors 3 and 3', the measurement sensors are fitted entirely inside the belt H. If the structure of the measurement sensor allows it, the measurement sensor can, if desired, be arranged on the surface of the belt shell in such a manner that only part of the sensor penetrates inside the belt.

FIG. 2 shows a measurement sensor 3 implemented with an electromechanical film sensor and fitted in the section of the belt H at the location of the nip N according to the invention, said sensor being sensitive to the pressure prevailing in the nip N. If a changing mechanical or acoustic force is exerted on the belt H, which produces a deformation or local thickness change in the film 26, this change produces a voltage between the electrodes 28, 30. In the case of FIG. 2, the measurement sensor 3 is composed of a compressible EMFi film 26 with a permanent electric charge. By means of the EMFi film it is possible to measure dynamic i.e. changing forces or pressures. The film 26 is typically made of a foamed plastic film having a thickness of approximately 0.037 to 0.18 mm, typically approximately 0.05 mm, and containing thin metal electrodes 28 and 30 on its both sides.

Typical sensitivity of the electromechanical film sensor of the described kind is 100 to 1000 pC/N. The sensitivity can be increased by using several superimposed film layers. Information on the change of the voltage is transmitted by means of a transmitter 32 containing an antenna 31, to a receiver 34 situated outside the shoe roll. The change of the voltage is proportional to the pressure exerted on the belt shell.

Transmission of information between the measurement sensors 3, 3' and the external data processing unit 34 can be implemented in several different ways, for example by using slide contact wires and counter brushes that are disposed in a suitable manner. Transmission of information can also be implemented by utilizing wireless data transmission, as presented in FIG. 2. In the transmitter 32 inside the belt shell 22 it is possible to collect measurement information from the measurement sensors 3, 3' and transmit the information further as an electromagnetic signal for example via an antenna 32' coupled to the transmitter to a receiver 34 outside the shoe roll, which is connected to a data processing and control unit, such as the monitoring and control system of the shoe calender. In the communication between the transmitter and the receiver it is possible to use amplitude or frequency modulation or another suitable modulation method of the electromagnetic signal in radio wave, microwave or infrared frequency ranges.

The electrical supply to the measurement sensors 3, 3' or the transmitter 32 in the belt shell 22 can be accomplished for example by conducting electricity to them from a slide contact wire placed on the edge of the belt shell on the entire length of the belt. The electric supply can, on the other hand also be effected from a battery or a corresponding device inside the belt shell, which can be charged for example in connection with the maintenance of the belt shell. The electric supply can also be implemented as wireless power transmission, which method, however, is at present only used in space technology, in which power is transmitted by means of microwave technology via RF (Radio Frequency) waves from a transmitter to a receiver where it is converted into direct current.

FIG. 3 shows a section of the shoe calender 10 in the cross-machine direction, in which the shoe roll 1 comprises several loading cylinders 16' arranged successively in the cross-machine direction, the purpose of which loading cylinders is to produce the desired profile for the paper, for example with respect to gloss, thickness, roughness or bulk. By utilizing the solution according to the invention it is possible to determine the actual nip pressure prevailing in the calender nip and the distribution of the nip pressure in the cross-machine direction and to adjust the same to a desired value.

In the situation shown in FIG. 3, it is thus possible to adjust the pressures of the loading cylinders 16' on the basis of the nip pressure distribution in the cross-machine (CD) direction, obtained by means of the solution according to the invention. The measurement sensors are film sensors 3 which are formed of electromechanical film sensors arranged in measurement zones inside the belt shell 22 of the shoe roll and encircling the roll. Thus, the method can be applied for the control of a zone-controlled (1-N zones) shoe roll. Each zone cylinder (1-N) of the shoe roll can be controlled on the basis of the measured pressure distribution profile. By applying the method it is possible to implement an accurate adjustment of the cross direction profile of paper in the shoe calender.

The solution according to the invention can be used for condition monitoring of the shoe calender. By utilizing the solution according to the invention it is possible to detect the effect of the changes in the condition of the belt of the shoe calender and the changes in the machine speed on the state of the nip and the shape of the pressure distribution better than before. Thus, it is possible to utilize the nip pressure distribution information for monitoring the condition of the belts and detecting local belt disturbances, which are reflected as changes in the nip pressure On the other hand, the solution according to the invention can also be used in the control of the calender in the machine direction as well as in the control of the zone pressures of the profiling shoe roll. Pressure information in the machine direction is obtained from the distribution profile in the cross-machine direction by averaging and by suitable filtering. The measurement information obtained from the cross direction distribution profile can thus also be used for the adjustment of the tilt of the shoe. On the basis of the measurement according to the invention it is thus possible to adjust both the loading of the shoe roll and the tilt of the shoe. The shoe roll is adjusted on the basis of the pressure distribution measurement advantageously by following the feedback principle. The method according to the invention enables the use of an accurate paper grade specific control strategy of the nip profile in the machine direction.

The solution according to the invention can also be applied in connection with the closing of the nip. On the basis of the measured pressure distribution information of the nip it is possible to determine when the nip is balanced, i.e. in a straight position. On the basis of the measurement information it is possible to change the loading of the tending side (TS) and the driving side (DS) of the machine, if necessary.

The measurement method can also be used for calibration and condition monitoring of zone control valves (e.g. Moog) of a zone-controlled shoe roll. It is also possible to use the measurement information in the condition monitoring of the belt for example by monitoring and registering pressure levels and service hours.

In the following, the use of PPL sensors in the determination of the pressure distribution of the nip in a nip formed between two rotating rolls is illustrated.

FIG. 4 shows schematically the operating principle of a PPL sensor, which is disclosed for example in U.S. Pat. No. 5,446,334. The sensor is capable of converting the thermomechanical stress within a given area into a luminescence visible in the same area. The sensor is film-like and it has a piezo-pyroelectric film portion (PPE) which contains a continuous film made of conductive material, a film made of piezo-pyroelectric material connected thereto, and on the other side of said film yet another film made of conductive material, which forms the film remaining inside the sensor. The piezo-pyroelectric film or material layer is capable of producing a potential difference dependent on the thermomechanical stress exerted thereon between its opposite surfaces. On the other side of the film made of conductive material remaining inside the sensor there is a film or material layer LED made of electroluminescent material, on the other side of which in a direct contact thereto there is a film made of conductive material that forms the outermost layer of the sensor. The electroluminescent film portion is capable of transmitting visible light, the intensity of which is dependent on the potential difference produced by the piezo-pyroelectric film portion. The layers attached to the electroluminescent material layer (LED) must be transparent to such an extent that it is possible to detect the light transmitted by the material. For example the outermost conductive film connected to the material layer LED can be made of sufficiently transparent material.

The different thermomechanical stresses of the different areas located in the two-dimensional plane of the film-like sensor material 3 can be visualized by means of luminous intensities changing in a corresponding manner by dividing the film inside the sensor in the same plane into separate conductive areas, between which there are electrically non-conductive areas. Thus, the conductive areas isolated from each other in the inner film are at different potentials, depending on the thermomechanical stresses effective at corresponding points, thus affecting the electroluminescent material in different ways and producing luminous intensities that vary by areas. Hereinbelow, when sensors 3 placed in different locations are mentioned, they can mean to separate sensor films, which each give the luminous intensity corresponding to the situation in their location, or to a sensor film extending on a wider area and containing different areas whose luminous intensities can be distinguished from each other.

FIG. 5 shows an embodiment, in which the method is used in connection with the roll of a paper or paperboard machine or finishing machine for paper or paperboard with the purpose of measuring the pressure distribution prevailing in the nip between the roll and the counter element. FIG. 2 shows a calender which contains at least one roll 1 equipped with a soft roll coating 1a, as well as a counter element 2 forming a nip with the roll, which can also be a roll. In the situation shown in FIG. 2, this counter element 2 is a metal roll with a hard surface, for example a chill cast roll. The distribution of the pressure in the nip N between the roll 1 and the counter element 2 in the cross-machine direction, i.e. the axial direction of the roll, the pressure profile, is shown at the bottom of FIG. 2. The outer periphery of the roll 1, in other words a specific outermost zone in the radial direction, forms in this case an element moving in the machine direction at the location of the nip N.

The calender roll 1 shown in FIG. 5 is a so-called light roll, containing a core 1c formed of a light material (foam, cellular structure, or light composite material), a pipe-like shell 1b around the same and on top of that a coating layer 1a forming a soft surface, for example a polymer coating. The PPL sensors 3 are placed for example in strips extending in the peripheral direction at fixed intervals over the width of the roll 1 in such a manner that it is possible to measure the nip pressure according to the above-presented principle within a given zone. It is possible to place the PPL sensors in other ways as well, for example in a spiral- or dot-like manner, but in such a manner, however, that in all alternatives extensive nip pressure information is obtained on the entire width of the roll with a set spacing in the width direction of the roll. According to FIG. 2 the sensors 3 are placed between the core 1c and the pipe 1b located around the core. It is also possible to place the sensors 3 between the pipe 1b and the outermost coating layer 1a or inside the coating layer 1a. In all placement alternatives it must be possible for the PPL sensor 3 to detect the force proportional to the nip pressure at the corresponding location in the axial direction of the roll.

To measure the output variable, the luminous intensity, given by the sensors 3, a detector device 4, in this case a camera that images the surface of the roll 1 over its entire width is placed in connection with the roll 1. To measure the intensities with a detector outside the roll, the light emitted by the sensors 3 must be able to escape outside the roll. In this case the material of the shell 1b and the polymer coating 1a must be translucent to such an extent that the differences in intensity can be detected by means of a detector device. If the sensors are placed immediately below the coating layer 1a or inside the same, the coating layer or its surface layer, respectively, must be made of sufficiently translucent material.

The detector device 4 can be for example a camera with optics and a light-sensitive sensor by means of which it is possible to measure and distinguish from each other the intensities emitted by different sensors 3. For this purpose, the detector device may have a sensor that comprises several pixels, wherein by means of the different pixels of this sensor it is possible to convert the luminous intensity to an electric signal directly proportional thereto for the purpose of further processing of measurement information, for example adjustment. It is not necessary to produce an image of the target by means of the detector device. Furthermore, it is possible that the detector device is a scanning device that moves in the axial direction of the roll and images only a given axial zone at a time as well as the sensor or sensors 3 located therein. By means of the camera arrangement it is possible to transmit the measurement information in the form of luminous intensity directly outside the rotating roll 1.

Instead of direct imaging it is possible to transmit information for example via optical fibres from the vicinity of the sensors 3 to the detector device, by means of which it is possible to measure the luminous intensity from different sensors. The detector device can convert the luminous intensity into an electric variable proportional thereto, and it can belong to a transmitter part revolving with the roll. The transmitter part transmits measurement information wirelessly according to the telemetry principle to a stationary receiver part which is connected to the data processing device to process the measurement information. In FIG. 2 such a detector device 4' is illustrated with a broken line and a broken line also illustrates the receiver part 5 located outside the roll.

In a manner similar to the embodiments of FIGS. 1 to 3, in the embodiment of FIG. 5 the information given by the sensors 3 is also used for the control of the pressure distribution of the nip in a control loop, in the data processing and control unit of which control loop a control variable is produced on the basis of the measurement information, said control variable controlling one or more actuators, the operation of which can be utilized to affect the pressure distribution of the nip in the cross direction and/or machine direction.

By means of the sensor arrangement according to FIG. 5, it is also possible to measure the pressure distribution of at least one nip in a multinip calender in the cross-machine direction and to conduct a feedback control of at least one variable in the calendering process on the basis of the information. Thus, the cross direction pressure distribution obtained by means of the sensors is utilized for the control of the pressure distribution of the nip in a control loop in whose data processing and control unit a control variable is produced on the basis of the measurement information, said control variable controlling one or more actuators, the operation of which can be utilized to affect the pressure distribution of the nip in the cross direction. The actuators may be relief cylinders controlling the relief of the intermediate rolls of the multinip calender, the pressure of which cylinders can be utilized to affect the nip pressure distribution in the cross direction and to obtain the desired nip pressure profile in the measured nip.

The piezo- and pyroluminescent sensors shown in connection with FIGS. 4 and 5 can also be used as sensors 3 placed in the belt H, and the measurement information can be received from these sensors with the same optical principles as in the calender of FIG. 5. In a corresponding manner, it is possible to use the film sensors comprising an elastic film, especially electromechanical film sensors, presented in connection with FIGS. 1 to 3, for arranging sensors in the calender roll 1 shown in connection with FIG. 5, and these sensors can be placed in the roll in the same manner as described with reference to FIG. 5.

What is claimed is:

1. A method in the manufacture of paper or paperboard to measure different forces prevailing in a nip between an element moving in the machine direction of an apparatus conveying a paper or paperboard web and a counter element, the method comprising:

measuring the forces at several measurement points using one or more sensors placed in the element moving in the machine direction; and utilizing information obtained from the measurement points to determine the pressure distribution of the nip;

wherein the element moving in the machine direction and forming a nip with the counter element is a belt passed between a shoe element or the like and a counter element, and wherein the pressure distribution in the nip is measured by means of one or more sensors placed in the belt.

2. The method of claim 1, wherein the belt forms a belt shell of a shoe roll.

3. The method of claim 1, wherein the sensor is a film sensor which is capable of converting the pressure exerted on the film into a suitable output signal.

4. The method of claim 3, wherein the sensor is a piezo- and pyroluminescent sensor (PPL sensor), or a sensor composed of an elastic film and a sensor connected to the film that is capable of registering at least one deformation occurring in the film, such as compression or expansion of the film.

5. The method of claim 4, wherein the sensor is a piezo- and pyroluminescent sensor and wherein the measurement information is at least in the initial stage received optically from the sensor.

6. The method of claim 5, wherein measurement information is received from the sensor by directly imaging the sensor.

7. The method of claim 5, wherein measurement information is received from the sensor via a photoconductor, such as optical fiber.

8. The method of claim 4, wherein the sensor has an electromechanical plastic film with permanent electric charge, and at least one electrode is connected to said film, said electrode being capable of registering a deformation occurring in the film.

9. The method of claim 4, wherein the sensor is made of a film whose charge distribution changes as a result of pressure exerted on the film and induces an electric charge, and of at least one electrode which is connected to said film and is capable of registering the change in the electric charge of the film.

10. The method of claim 1, wherein the pressure distribution of the nip is determined at least in the cross direction of the paper or paperboard web.

11. The method of claim 10, wherein the pressure distribution of at least one nip in a multinip calender is measured.

12. A measurement system in the manufacture of paper or paperboard for measuring different forces prevailing in a nip between an element moving in the machine direction of an apparatus conveying a paper or paperboard web and a counter element, comprising:

one or more sensors placed in the element moving in the machine direction, the one or more sensors measuring the forces at several measurement points, and a data communication line from the one or more sensor to a data processing unit, which determines a pressure distribution of the nip on the basis of measured information obtained from the one or more sensors at the several measurement points, wherein the element moving in the machine direction and forming a nip with the counter element is a belt passed between a shoe element or the like and a counter element, and wherein the one or more sensors for measuring the pressure distribution of the nip are placed in the belt.

13. The system of claim 12, wherein the system further comprises a control loop containing a data processing and control unit connected to the one or more sensors via the data communication line, which unit controls one or more actuators, the operation of which can be utilized to affect pressure distribution of the nip.

14. The system of claim 12, wherein the belt forms a belt shell of a shoe roll.

15. The system of claim 12, wherein at least one of the one or more sensors is a film sensor which is capable of converting pressure exerted on the film into a suitable output signal.

16. The system of claim 15, wherein the at least one sensor is a piezo- and pyroluminescent sensor (PPL sensor), or a sensor composed of an elastic film and a sensor connected to the film that is capable of registering at least one deformation occurring in the film, such as compression or expansion of the film.

17. The system of claim 12, wherein the one or more sensors are placed in the element moving in the machine direction in different locations in the cross direction of the web to determine a pressure distribution of the nip in a transverse direction.

* * * * *